(12) United States Patent  (10) Patent No.: US 8,462,468 B2
Katada et al.  (45) Date of Patent: Jun. 11, 2013

(54) MAGNETIC HEAD AND MAGNETIC DISK DRIVE TO BE USED FOR SHINGLED RECORDING METHOD

(75) Inventors: Hiroyuki Katada, Odawara (JP); Takayuki Ichihara, Tokyo (JP); Yoshiaki Kawato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 114 days.

(21) Appl. No.: 13/095,450

(22) Filed: Apr. 27, 2011

(65) Prior Publication Data

US 2011/0292545 A1  Dec. 1, 2011

(30) Foreign Application Priority Data

May 31, 2010  (JP) ................................. 2010-124342

(51) Int. Cl.
*G11B 5/33* (2006.01)
*G11B 5/127* (2006.01)

(52) U.S. Cl.
USPC ...................................... 360/319; 360/125.3

(58) Field of Classification Search
USPC .............................. 360/324.2, 319, 313, 125.3
See application file for complete search history.

(56) References Cited

U.S. PATENT DOCUMENTS

| | | | | |
|---|---|---|---|---|
| 6,134,089 | A * | 10/2000 | Barr et al. | 360/322 |
| 6,177,207 | B1 * | 1/2001 | Koike | 428/811.5 |
| 6,243,241 | B1 * | 6/2001 | Kanai | 360/324.11 |
| 6,741,421 | B2 | 5/2004 | Mochizuki et al. | |
| 8,223,458 | B2 * | 7/2012 | Mochizuki et al. | 360/125.1 |
| 8,264,798 | B1 * | 9/2012 | Guan et al. | 360/319 |
| 8,310,786 | B2 * | 11/2012 | de la Fuente et al. | 360/125.3 |
| 8,339,734 | B2 * | 12/2012 | Pentek et al. | 360/119.03 |
| 2005/0118329 | A1 * | 6/2005 | Kamijima | 427/127 |
| 2005/0219764 | A1 | 10/2005 | Kameda et al. | |
| 2009/0002896 | A1 * | 1/2009 | Mallary et al. | 360/319 |
| 2011/0292545 | A1 * | 12/2011 | Katada et al. | 360/123.12 |

FOREIGN PATENT DOCUMENTS

| | | |
|---|---|---|
| JP | 2002-279606 | 9/2002 |
| JP | 2005-293693 | 10/2005 |

* cited by examiner

*Primary Examiner* — Brian Miller
(74) *Attorney, Agent, or Firm* — Foley & Lardner LLP

(57) ABSTRACT

In a magnetic head to be used for a shingled recording method, degradation of a signal resolution and a decrease in a signal-to-noise ratio which are caused by an asymmetrical inter-bit transition curvature are prevented, and a low bit error rate is realized. A magnetic head includes a recording head and a reproducing head. The reproducing head includes a pair of magnetic shields and a sensor sandwiched between the pair of magnetic shields. The gap between the magnetic shields is formed so that the longitudinal direction thereof gets inclined by a certain angle with respect to a cross-track direction in line with the shape of a curvature of an inter-bit transition on an effective record track in a record pattern recorded on a recording medium.

6 Claims, 7 Drawing Sheets

FIG. 1

DOWN-TRACK DIRECTION

CROSS-TRACK DIRECTION

FIG. 2

TRANSITION CURVATURE OF SINGLE RECORD PATTERN, C

RECORD TRACK WIDTH OF SINGLE RECORD PATTERN, MWW

EFFECTIVE RECORD TRACK WIDTH, $MWW_S$

DOWN-TRACK DIRECTION

CROSS-TRACK DIRECTION

DOWN-TRACK DIRECTION
CROSS-TRACK DIRECTION

MAGNETIC HEAD AND MAGNETIC DISK DRIVE TO BE USED FOR SHINGLED RECORDING METHOD

CLAIM OF PRIORITY

The present application claims priority from Japanese patent application JP2010-124342 filed on May 31, 2010, the content of which is hereby incorporated by reference into this application.

BACKGROUND OF THE INVENTION

1. Field of the Invention

The present invention relates to a magnetic head and a magnetic disk drive, or more particularly, to a magnetic head and a magnetic disk drive which are used for a shingled recording method.

2. Description of the Related Art

For increasing the storage capacity of a magnetic recording device represented by a hard disk drive, it is necessary to improve a recording density for information to be recorded in recording media. In order to improve the recording density, there is made an approach that the width of a recording track recorded in the medium is narrowed to increase a track density, or that a bit length on the recording track is shortened, that is, a linear recording density is increased. However, when the pole width of a recording head is narrowed in order to increase the track density, that is, in order to narrow the recording track width, the intensity of a recording magnetic field induced by the recording head is generally decreased, and a sufficient ability to write the recording media becomes unavailable.

Cited as a method for addressing the problem is a method called shingled recording. According to the shingled recording method, when a certain track is recorded, the track is recorded while being overwritten on one side of an adjoining recording pattern that is already recorded. Another recording track is formed while being overwritten on the same side of another recording pattern. As a result, an effective recording track width in the shingled recording method takes on a value obtained by subtracting the width of a portion, which is deleted while being overwritten with an adjoining track, from the width of a recording pattern formed by the recording head. Therefore, the shingled recording method obviates the necessity of matching the pole width of the recording head with the recording track width. This makes it possible to adopt the recording head whose pole width is larger than the effective recording track width. Therefore, even when the effective recording track width is diminished, a sufficient writing ability is available. As a result, a high track density can be realized, and a high areal density can be provided.

By the way, as far as a magnetic recording device represented by a hard disk drive is concerned, a gap is created between a head and a recording medium in order to prevent abrasion between the head and recording medium. A recording magnetic field induced by the magnetic poles of the recording head spatially spreads as long as the gap is present between the recording medium and recording head. Therefore, an inter-bit transition in a down-track direction of a recording track (a longitudinal direction of a record track, that is, a head advancing direction) does not appear straight in line with the shape of the recording head but is curved without fail. This is called a transition curvature.

In the shingled recording method, a one-side edge of a recording pattern that is recorded once is overwritten with an adjoining track in order to form an effective recording track. In other words, the recording method leaves a portion that has not been overwritten. Compared with an existing method in which the recording pattern is not overwritten, the magnitude of a curvature that occupies an effective recording track width gets larger. In addition, the transition curvature is always asymmetrical.

A typical reproducing head includes a sensor that senses a signal magnetic field induced from a recording medium, and a pair of magnetic shields that is formed to sandwich the sensor. In the reproducing head, the gap between the shields is formed to be parallel with a cross-track direction of a recording track (a direction intersecting a track, that is, a direction perpendicular to the down-track direction).

When the foregoing reproducing head is used to reproduce a recording track that has been recorded in a shingled manner, the shape of the shield-to-shield gap is deviated from a bit shape, which shows that an inter-bit transition is asymmetrically curved, due to the transition curvature and the fact that the recording track is overwritten on one side of a recording pattern. Therefore, a signal resolution in the down-track direction and a signal-to-noise ratio therein are degraded. This poses a problem in that a bit error rate increases.

A method of denting a trailing edge of a recording head which is disclosed in Japanese Patent Application Laid-Open Publication No. 2002-279606 and Japanese Patent Application Laid-Open Publication No. 2005-293693 proves effective in reducing a curvature. However, it is unfeasible to form a dent locally in the delicate recording head during a process of manufacturing the recording head, and to control the depth of the dent. Even if a transition curvature can be reduced by devising the shape of the trailing edge, as long as there is a gap between the recording head and a recording layer of a medium, since a magnetic field induced by the recording head spatially spreads, the transition curvature will not, in principle, be eliminated. The problem of an increase in a bit error rate due to the transition curvature remains unsolved.

SUMMARY OF THE INVENTION

An object of the present invention is to provide a magnetic head and a magnetic disk drive capable of, when a shingled recording method is adopted, preventing degradation of a signal resolution and a decrease in a signal-to-noise ratio which are derived from an asymmetrical inter-bit transition curvature, and realizing a low bit error rate.

In order to address the problem, the present invention employs a constitution described below.

A magnetic head in accordance with the present invention is a magnetic head to be used for a shingled recording method in which a recording track is formed while being overwritten on one side of a recording pattern. The magnetic head includes a recording head and a reproducing head. The reproducing head includes a pair of magnetic shields and a sensor sandwiched between the pair of magnetic shields. The gap between the magnetic shields is formed so that the longitudinal direction thereof gets inclined with respect to a cross-track direction in line with the shape of a curvature of an inter-bit transition on an effective recording track in a recording pattern recorded on a recording medium.

At this time, the sensor may be formed so that the film-surface direction thereof gets inclined with respect to the same direction as the direction with respect to which the gap between the magnetic shields is tilted, or may be formed so that the film-surface direction thereof corresponds to the cross-track direction.

The gap between the magnetic shields may be curved or may be linearly tilted.

When the shape of the gap between the magnetic shields approaches the shape of a curvature of an inter-bit transition on an effective recording track, degradation of a signal resolution and a decrease in a signal-to-noise ratio which are derived from an asymmetrical transition curvature occurring during shingled recording can be suppressed more effectively than those in an existing reproducing head in which the gap between the magnetic shields is formed in parallel with the cross-track direction. Eventually, a bit error rate can be decreased.

In addition, another magnetic head in accordance with the present invention is a magnetic head to be used for a shingled recording method in which a recording track is formed while being overwritten on one side of a recording pattern. The magnetic head includes a recording head and a reproducing head. The reproducing head has a differential type sensor including two magnetic field sensing layers that are juxtaposed in a down-track direction and sense a signal magnetic field induced from a medium, and a differential intermediate layer sandwiched between the magnetic field sensing layers. The two magnetic field sensing layers and differential intermediate layer are formed so that the longitudinal directions thereof get inclined with respect to a cross-track direction in line with the shape of a curvature of an inter-bit transition on an effective recording track in a record pattern.

A magnetic disk drive in accordance with the present invention is a magnetic disk drive to be used for a shingled recording method in which a recording track is formed while being overwritten on one side of a recording pattern. The magnetic disk drive includes a magnetic head composed of a recording head and a reproducing head, a head slider in which the magnetic head is incorporated, and an actuator that tilts the magnetic head. At the time of reproduction, the actuator is controlled so that the longitudinal direction of the gap between shields of the reproducing head gets inclined with respect to a cross-track direction in line with the shape of a curvature of an inter-bit transition on an effective recording track in the recording pattern.

In the magnetic disk drive of the present invention, the actuator that tilts the magnetic head may be formed with a piezoelectric element. The magnetic head may be attached to the head slider via the piezoelectric element. At the time of reproduction, a voltage may be applied to the piezoelectric element in order to vary the dimension of the piezoelectric element, so that the longitudinal direction of the gap between the shields of the reproducing head gets inclined with respect to the cross-track direction.

In addition, in the magnetic disk drive of the present invention, the actuator that tilts the magnetic head may be formed with a piezoelectric element. The head slider may be incorporated in a head suspension. The head suspension may be attached via the piezoelectric element. At the time of reproduction, a voltage may be applied to the piezoelectric element in order to vary the dimension of the piezoelectric element, so that the longitudinal direction of the gap between the shields of the reproducing head gets inclined with respect to the cross-track direction.

Even in this case, degradation of a signal resolution and a decrease in a signal-to-noise ratio which are derived from a transition curvature can be suppressed, and a bit error rate can be decreased.

In the present invention, the tilt angle θ of the gap between the magnetic shields or the tilt angle θ of the two magnetic field sensing layers and differential intermediate layer falls within a range within which the tilt angle θ is 0 to 2.5 times larger than a mean angle α of an inter-bit transition curvature in a recording pattern. Therefore, compared with an existing structure in which a magnetic shield-to-shield gap is formed in parallel with the cross-track direction, a lower bit error rate can be realized.

In particular, when the tilt angle θ is set to a value that is 1.0 to 1.6 times larger than the mean angle α of a transition curvature, an effect of decreasing a bit error rate is maximized.

According to the present invention, when a shingled recording method is adopted, degradation of a signal resolution and a decrease in a signal-to-noise ratio which are derived from an asymmetrical inter-bit transition curvature can be prevented and a low bit error rate can be realized.

DETAILED DESCRIPTION OF THE INVENTION

Referring to the drawings, embodiments of the present invention will be described below.
(First Embodiment)

Figure 2:
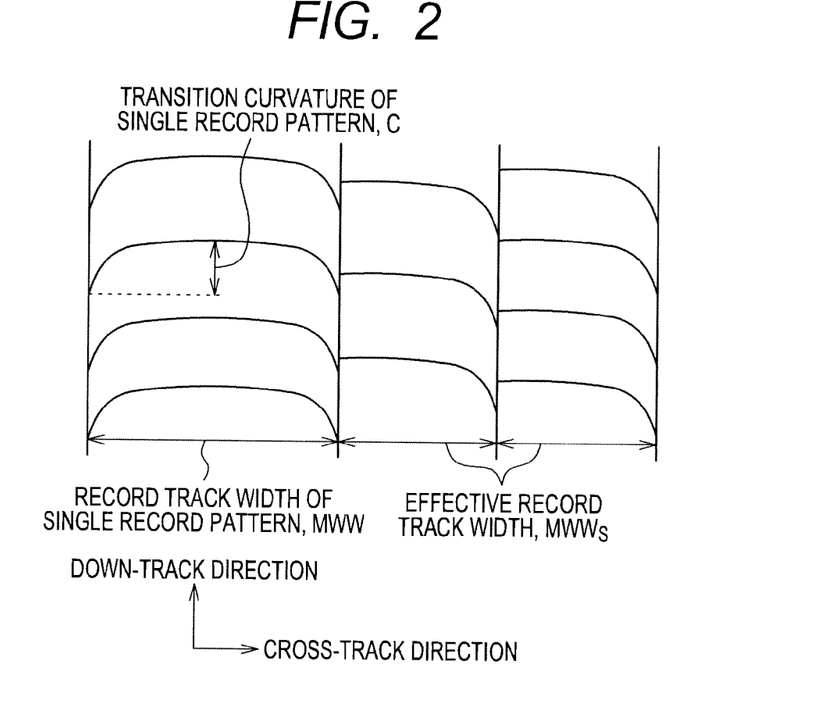
FIG. 2 is a diagram showing a recording pattern formed according to a shingled recording method.

FIG. 2 is an illustrative diagram of a recording track recorded according to a shingled recording method. As shown in FIG. 2, the magnitude of a transition curvature C in a single recording pattern is defined as a difference between the center of the recording pattern, which is not overwritten, and a transitional position in a recording down-track direction at an edge of the recording pattern. In comparison with a recording track width MWW of the single recording pattern one side of which is not overwritten, a recording track width of the single recording pattern one side of which is overwritten shall be called an effective recording track width MWWs. In FIG. 2, the left sides of recording patterns are sequentially overwritten. Alternatively, the right sides of the recording patterns may be sequentially overwritten. As shown in FIG. 2, since one side of a recording track is overwritten according to the shingled recording method, an inter-bit transition in the down-track direction on an effective record track on a medium exhibits a larger curvature on one side of the track.

Figure 1:
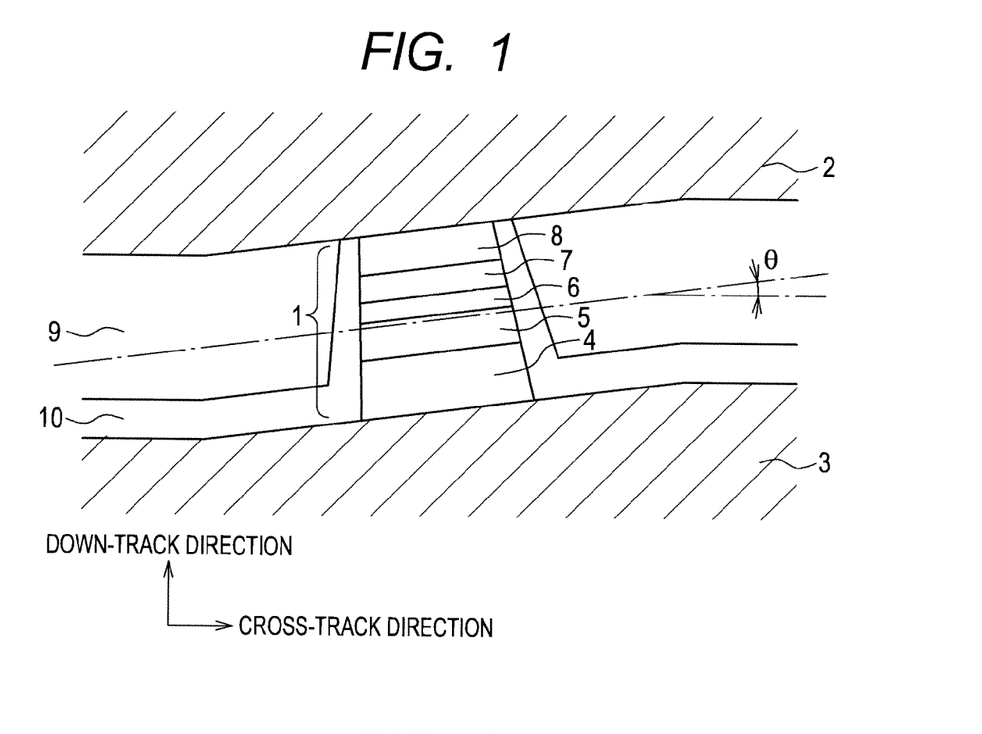
FIG. 1 is a diagram showing a construction of a reproducing head of a first embodiment of the present invention.

FIG. 1 is an illustrative diagram showing a first example of a construction of a reproducing head of the present invention which is seen from a medium opposite surface thereof. The reproducing head of the present invention includes a sensor 1 that senses a signal magnetic field induced from a recording medium, and a pair of magnetic shields (a lower magnetic shield 2 and an upper magnetic shield 3) that sandwich the sensor 1. The gap between the magnetic shields is formed to be tilted by an angle θ with respect to a cross-track direction in line with a transition curvature of an effective recording pattern. The upper magnetic shield 2 and lower magnetic shield 3 are made of a soft magnetic material represented by a nickel-iron (NiFe) alloy exhibiting a high permeability.

The sensor 1 includes an antiferromagnetic layer 4, a magnetic pinned layer 5, a nonmagnetic intermediate layer 6, 5 a magnetic free layer 7, and a protective layer 8.

The magnetic pinned layer 5 and magnetic free layer 7 are formed with laminated films made of a cobalt-iron (CoFe) alloy or a NiFe alloy. Alternatively, single-ply films made of a cobalt-iron-boron (CoFeB) alloy, a cobalt-manganese-germanium (CoMnGe) Heuslar alloy, a cobaltmanganese-silicon (CoMnSi) Heuslar alloy, a cobaltchromium-aluminum (CoCrAl) Heuslar alloy, or a cobalt-ironaluminum (CoFeAl) alloy, or laminated films made of a combination of any of these alloys will do.

The nonmagnetic intermediate layer 6 is formed using magnesium oxide (MgO) in efforts to bring about a tunnel magnetoresistive effect. Alternatively, alumina or a titanium oxide will do. Otherwise, in order to bring about a giant magnetoresistive effect, copper (Cu), gold (Au), silver (Ag), or their alloy will do.

The magnetic pinned layer 5 may be constructed with a one-ply magnetic layer. A construction having plural magnetic layers that sandwich a bonding layer which bonds magnetizations in antiparallel with each other will not contradict the gist of the present invention.

The antiferromagnetic layer 4 is a layer to which a bias for bonding with exchange interaction is applied in order to substantially fix the magnetization of the magnetic pinned layer 5, and may be formed to be in close direct contact with the magnetic pinned layer.

Alternatively, the antiferromagnetic layer 4 may undergo indirect magnetic bonding. Otherwise, instead of the antiferromagnetic layer, other bias application magnetization, for example, a remanent magnetization on a hard magnetic film or a current bias may be employed.

Bias layers 9 are arranged on both sides in the cross-track direction of the sensor. Nonmagnetic substances 10 are formed among the bias layers 9 and magnetic free layer. The magnetic free layer 7 has domains thereof controlled by a magnetic field applied from the bias layers, and operates at a desired utilization ratio relative to a magnetic field that should be sensed.

When the direction of a magnetization of the magnetic free layer 7 varies depending on the orientation of a signal magnetic field induced from a recording medium, a relative angle to a magnetization of the magnetic pinned layer 5 changes. Accordingly, a resistance of the sensor 1 changes due to a tunnel magnetoresistive effect. Eventually, information recorded in the recording medium can be reproduced.

In the form of the first embodiment, the sensor is formed so that the film surface of the magnetic free layer becomes substantially parallel to the gap between the magnetic shields. Both the gap between the magnetic shields and the film surface of the magnetic free layer are tilted with respect to the cross-track direction in line with a transition curvature of an effective recording pattern. A range within which the gap between the magnetic shields is tilted is limited to a range involved in reproduction of a recording track. The other portion outside the range is, as shown in the drawing, parallel to the cross-track direction.

Figure 3:
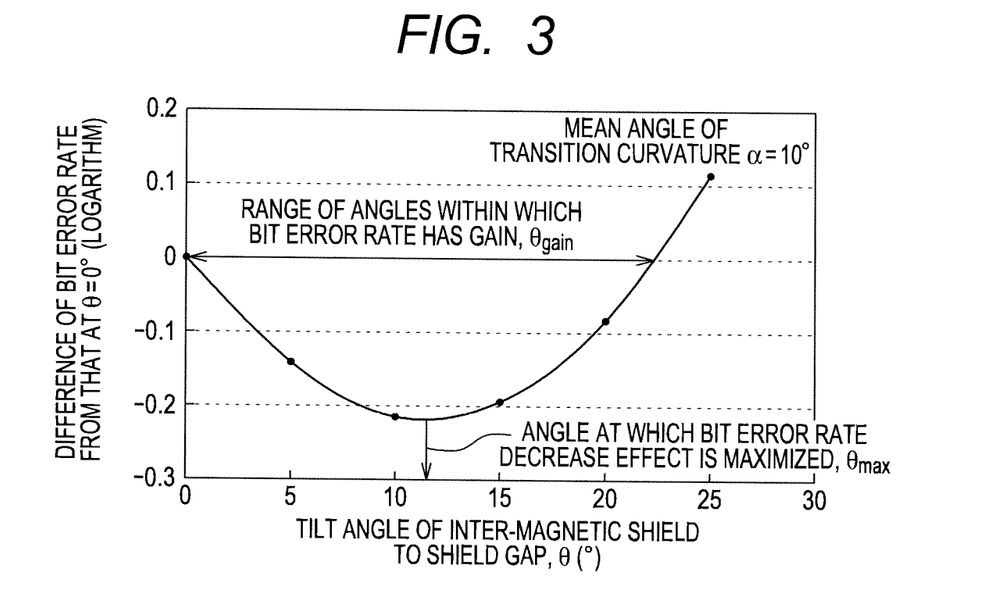
FIG. 3 is a diagram showing an example of a characteristic curve of the first embodiment of the present invention.

FIG. 3 shows an example of results of an experiment conducted on an effect of improvement of a bit error rate in relation to a tilt angle θ of the gap between the magnetic shields of the reproducing head. The bit error rate is defined as a value obtained by dividing the number of bits, reproduction of which has caused an error, by the number of all reproduced bits on the assumption that a signal which has bits of random bit lengths mixed therein is reproduced by simulating a state in which the magnetic disk drive is actually used.

The vertical axis of FIG. 3 indicates in an logarithmic expression a difference between a bit error rate associated with a certain tilt angle θ of the gap between the magnetic shields and a bit error rate associated with a tilt angle of 0 (existing structure). A larger negative value signifies that the bit error rate is lower and performance is higher. For example, −0.1 signifies that the bit error rate is lower by $10^{-0.1}$. Herein, the results shown as an example are concerned with a case where: the width MWW of a single recording pattern is 100 nm; an edge of 25 nm wide of the recording pattern is overwritten by an adjoining track; and an effective recording track width MWW is 75 nm. In addition, the magnitude C of a transition curvature in the single recording pattern is 10 nm, and a mean angle α of the transition curvature of an effective recording track is 10

If the magnetic shields are tilted in a direction along a transition curvature so that the tilt angle θ of the magnetic shields increases from 0 (existing structure), the bit error rate decreases. When the tilt angle θ is about 12, the bit error rate takes on a minimal value. When the magnetic shields are further tilted, the error rate is gradually degraded. When the tilt angle θ becomes equal to or larger than 22, the bit error rate is degraded to be lower than that of the existing structure (tilt angle of 0)

As mentioned above, when the shingled recording method is adopted, if the magnetic shields of the reproducing head are tilted, that is, the angle of the gap between the magnetic shields is approached to that of a recording pattern on a medium, a bit error rate can be minimized. However, as shown in FIG. 3, there is a range $θ_{gain}$ of tilt angles within which the bit error rate gets lower than that caused by the existing structure in which the tilt angle is 0°. When the magnetic shields are tilted at an angle equal to or larger than a certain angle, the bit error rate increases.

In the present invention, the mean angle α of a transition curvature of an effective recording track is defined as mentioned below.

Figure 4:
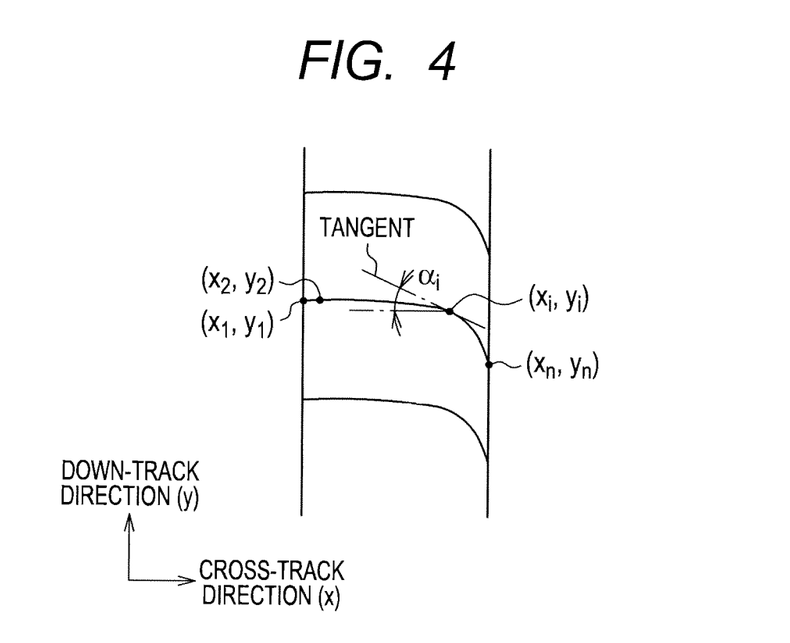
FIG. 4 is an explanatory diagram concerning a mean angle of a transition curvature.

As shown in FIG. 4, within a recording medium surface, a down-track direction (a longitudinal direction of a recording track, that is, a head advancing direction) shall be a y direction, and a cross-track direction (a direction intersecting the track, that is, a direction perpendicular to the down-track direction) shall be an x direction. Transitional positions of bits in the down-track direction appear to be curved.

A recording track width is equally divided into n sufficiently thin portions in the cross-track direction. At this time, x1, x2, etc., xi, etc., and xn denote the positions of the n portions in the x direction, and y1, y2, etc., yi, etc., and yn denote the positions thereof in the y direction. At a transitional position yi associated with a certain cross-track position xi, a tangent is drawn along a transition curvature, and an angle formed by the tangent and a straight line passing points of y=0 shall be an angle $\alpha i$. The angles $\alpha i$ at the positions from one edge of the recording track in the width direction thereof to the other edge thereof (from i=1 to i=n) are calculated, and averaged to obtain a mean angle $\alpha$ of the transition curvature.

In an ordinary recording method, since it does not take place that only one side of a once recorded track is overwritten, a transition curvature is symmetrical. The mean angle $\alpha$ is substantially 0°. In contrast, in the shingled recording method, a one-side edge of a recording pattern that is recorded once is overwritten to be deleted. Therefore, either of the right and left sides of a remaining effective recording track exhibits a larger curvature, and the mean angle $\alpha$ takes on a finite value.

When a width to be overwritten out of the width of the same recording pattern is increased, the mean angle $\alpha$ of a transition curvature on an effective recording track left after the overwriting gets larger. As long as a single recording pattern width MWW and the width to be overwritten remain unchanged, when the transition curvature C in the single recording pattern is larger, the mean angle $\alpha$ of the transition curvature on the effective recording track that is left after the overwriting is larger.

Typical methods of obtaining the mean angle $\alpha$ of a transition curvature of an effective recording track will be cited below. Namely, there are a method of directly observing a recording pattern using a magnetic force microscope and a method of observing the recording pattern by acquiring plural signal waves while offsetting a reproducing head in a cross-track direction, synthesizing the signal waves, and inversely convoluting a sensitivity distribution in the reproducing head.

A mean angle $\theta$ of a tilt of a shield-to-shield gap is defined as an angle relative to a straight line passing points of y=0.

Figure 5:
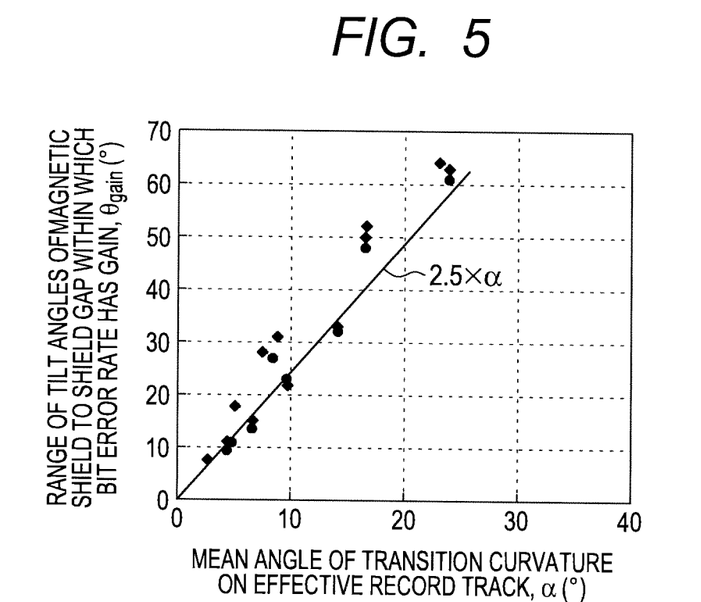
FIG. 5 is a diagram showing an example of another characteristic curve of the first embodiment of the present invention.

FIG. 5 shows the relationship between a range $\theta_{gain}$ of tilt angles, which is more effective in minimizing a bit error rate than a tilt angle of 0° in the existing structure, (a range of tilt angles $\theta$ of a magnetic shield-to-shield gap which is shown in FIG. 3 and within which a difference of the bit error rate is equal to or smaller than 0), and a mean angle $\alpha$ of an inter-bit transition curvature on an effective recording track.

Herein, under a condition that the width MWW of a single recording pattern is varied from 50 nm to 150 nm, a width by which the recording pattern is overwritten is varied from 10% of the single recording pattern to 80% thereof (that is, an effective recording track width MWWs is varied from 20% of the width MWW to 90% thereof), and the magnitude C of a transition curvature of the single recording pattern is varied from 5% of the single recording pattern width MWW to 20% thereof, the range $\theta_{gain}$ of tilt angles within which a bit error rate decreases as shown in FIG. 3 is obtained, and the maximum angle is indicated on the vertical axis.

As shown in FIG. 3, What counts is that the range $\theta_{gain}$ of tilt angles of the magnetic shield-to-shield gap, which is more effective in minimizing a bit error rate than the tilt angle adopted in the existing structure, is determined only with the mean angle $\alpha$ of a transition curvature of an effective recording track left after overwriting, but does not depend on the width MWW of a single recording track that is not yet overwritten, the magnitude C of the transition curvature of the signal recording track, the width to be overwritten, and the width MWWs of an effective recording track. The range $\theta_{gain}$ of tilt angles of the magnetic shield-to-shield gap, which is more effective in minimizing a bit error rate than the tilt angle adopted in the existing structure, is substantially 2.5 times larger than the mean angle $\alpha$ of the transition curvature of the effective recording track. In other words, once the tilt angle of the magnetic shield-to-shield gap with respect to the cross-track direction is determined to fall within a range from 0° to 2.5×$\alpha$, a lower bit error rate than a bit error rate attained in a case where a reproducing head of the existing structure is employed can be achieved.

Figure 6:
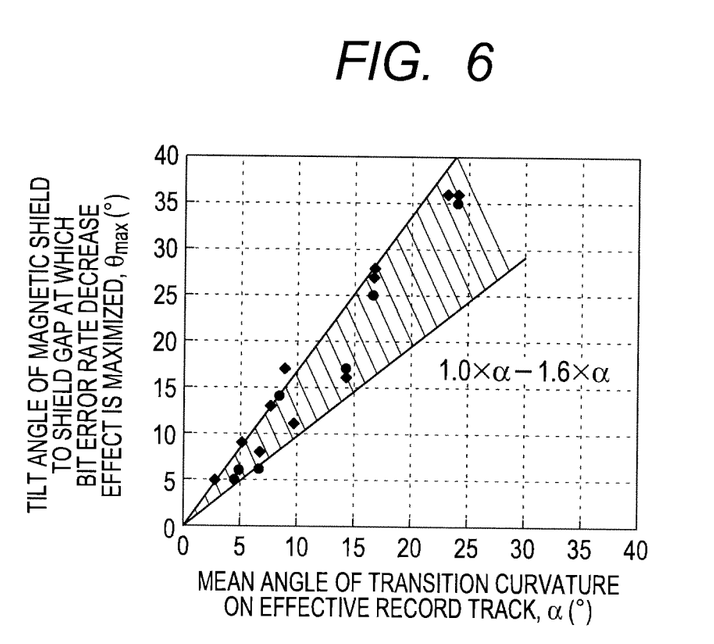
FIG. 6 is a diagram showing an example of another characteristic curve of the first embodiment of the present invention.

FIG. 6 shows the relationship between a tilt angle $\theta$ of a magnetic shield-to-shield gap, which minimizes a bit error rate, and a mean angle $\alpha 0$ of a transition curvature. Herein, under conditions that the width MWW of a single recording pattern is varied from 50 nm to 150 nm, a width by which the record pattern is overwritten is varied from 10% of the signal recording pattern width MWW to 80% thereof, and the magnitude C of a transition curvature of the signal recording pattern is varied from 5% of the single record pattern width MWW to 20% thereof, tilt angles $\theta_{max}$ that minimize the bit error rate are obtained based on the dependency of the bit error rate on the tilt angle of the magnetic shield-to-shield gap which is shown in FIG. 3. The tilt angles are indicated on the vertical axis.

As shown in FIG. 6, the tilt angle $\theta_{max}$ of a magnetic shield-to-shield gap most effective in minimizing a bit error rate does not depend on the width MWW of a single recording track that is not yet overwritten, the magnitude C of a transition curvature of a single recording pattern, a width by which the recording pattern is overwritten, and the width MWW of an effective recording track, but is determined only with the mean angle $\alpha$ of the transition curvature of the effective recording track, and ranges from 1.0×$\alpha$ to 1.6×$\alpha$.

When the mean angle $\alpha$ of a transition curvature of an effective recording track is consistent with the tilt angle $\theta$ of a shield-to-shield gap, that is, when $\theta=\alpha$ is established, an effect of decreasing a bit error rate is thought to be maximized. However, in reality, when the tilt angle of magnetic shields ranges from a 1.0 multiple of $\alpha$ to a 1.6 multiple of $\alpha$, the bit error rate can be minimized.

The reason why the highest effect is not exerted when the mean angle $\alpha$ of a transition curvature of an effective recording track is consistent with the tilt angle $\theta$ of a shield-to-shield gap will be described below.

Figure 7:
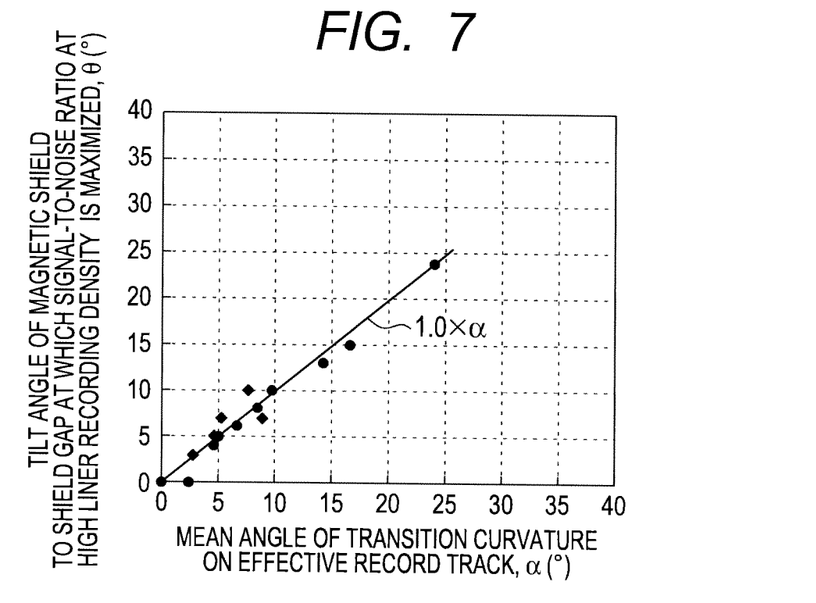
FIG. 7 is a diagram showing an example of another characteristic curve of the first embodiment of the present invention.

When a recording density (a linear recording density) in a down-track direction is high, that is, when the number of bit transitions is large in the longitudinal direction of a track, a ratio at which a noise caused by microscopic fluctuations of the transitional positions of bits occupies a noise to be sensed by the sensor is large. FIG. 7 shows the dependency of a signal-to-noise ratio attained at a high linear recording density on a tilt angle of a magnetic shield-to-shield gap. In this case, when the mean angle $\alpha$ of a transition curvature of an effective recording track is consistent with the tilt angle $\theta$ of the magnetic shield-to-shield gap, the signal-to-noise ratio at the high linear recording density is maximized.

Figure 8:
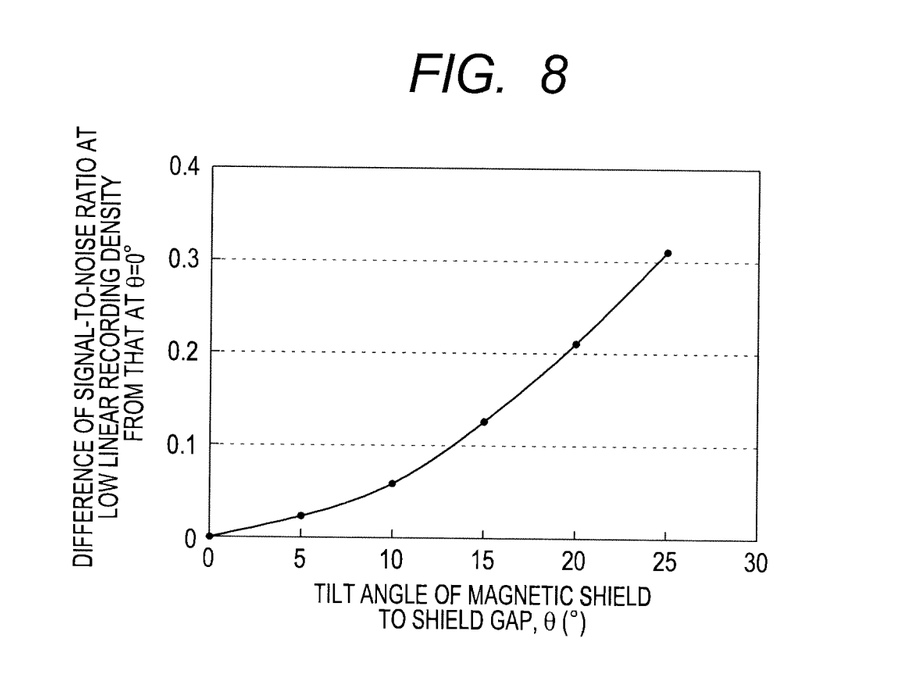
FIG. 8 is a diagram showing an example of another characteristic curve of the first embodiment of the present invention.

In contrast, when the linear recording density is low, that is, the number of bit transitions is small, the ratio of a noise, which is caused by microscopic fluctuations of transitional positions of bits, to a noise to be sensed by the sensor is limited. FIG. 8 shows an example of the dependency of a signal-to-noise ratio attained at a low recording density on the tilt angle $\theta$ of a magnetic shield-to-shield gap. As shown in FIG. 8, as far as the low linear recording density is concerned, when the tilt angle $\theta$ of a magnetic shield-to-shield gap increases, the signal-to-noise ratio improves. This is attributable to an edge noise occurring at a track edge because of fluctuation of the track edge. When the tilt angle θ of the magnetic shield-to-shield gap gets larger, a sensitivity distribution in a reproducing head gets inclined. Accordingly, a reproduction sensitivity distribution recedes from the track edge. In other words, a portion affected by the track edge noise is not reproduced. As a result, since the ratio of the noise, which is derived from bit transitions, to the noise to be sensed by the sensor is small at the low recording density, the signal-to-noise ratio improves owing to an effect of decreasing the track edge noise to such an extent that the magnetic shield-to-shield gap is tilted.

When a disk drive is used in practice, a signal representing bits of various lengths (that is, various linear recording densities) is recorded at random in a recording medium. Therefore, under actual conditions for use of the disk drive, the tilt angle θ of a magnetic shield-to-shield gap should be 1.0 to 1.6 times larger than the mean angle α of a bit transition curvature on an effective recording track rather than being consistent with the mean angle α. Thus, the signal-to-noise ratio of a random pattern exhibiting various recording densities that range from a low linear recording density to a high linear recording density can be optimized in total. As a result, a bit error rate can be most effectively minimized.

(Second Embodiment)

Figure 9:
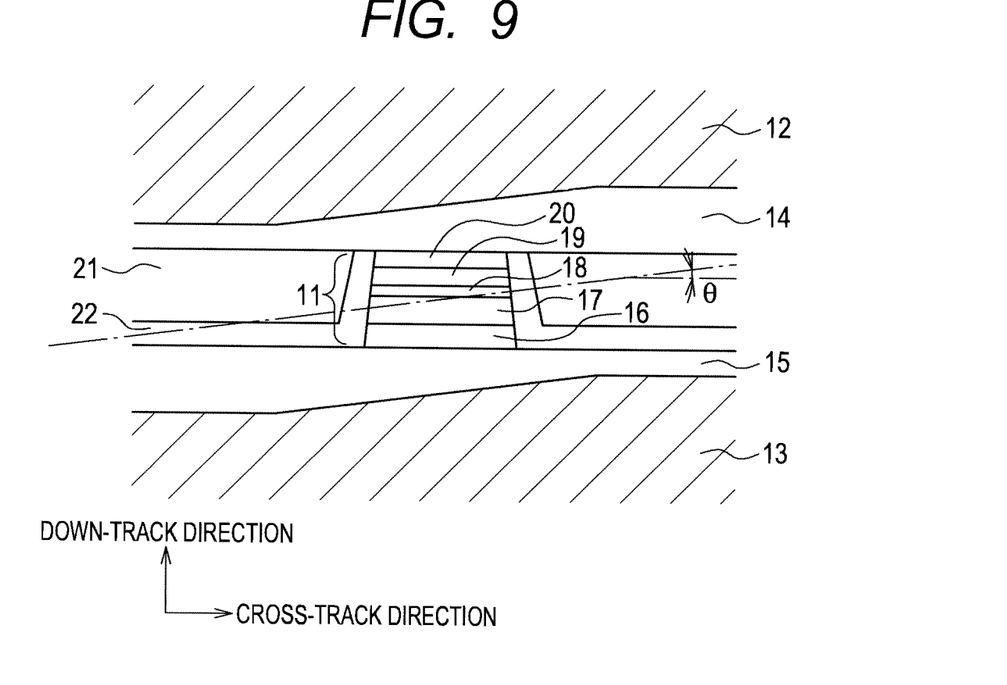
FIG. 9 is a diagram showing a construction of a reproducing head of a second embodiment of the present invention.

FIG. 9 is an illustrative diagram showing a medium opposite surface of a reproducing head having an example of a second construction in accordance with the present invention.

The reproducing head includes a sensor 11 that senses a signal magnetic field induced from a recording medium, a pair of magnetic shields (an upper magnetic shield 12 and a lower magnetic shield 13), an upper flattening layer 14 interposed between the sensor 11 and upper magnetic shield 12, and a lower flattening layer 15 interposed between the sensor 11 and lower magnetic shield 13. The gap between the magnetic shields is formed to tilt with respect to a cross-track direction in line with a transition curvature of an effective recording pattern. The upper magnetic shield 12 and lower magnetic shield 13 are made of a soft magnetic material represented by a NiFe alloy exhibiting a high permeability. The upper flattening layer 14 and lower flattening layer 15 are layers for use in flattening the sensor 11, and have the thicknesses thereof varied in the cross-track direction according to the tilt of the magnetic shields. The upper flattening layer 14 and lower flattening layer 15 are made of alumina. Alternatively, tantalum (Ta) or ruthenium (Ru) may be used as long as the layers become nonmagnetic layers.

The sensor 11 includes an antiferromagnetic layer 16, a magnetic pinned layer 17, a nonmagnetic intermediate layer 18, a magnetic free layer 19, and a protective layer 20. These layers can be constructed in the same manner as they are in the first embodiment.

The direction of a magnetization of the magnetic free layer 19 varies depending on the orientation of a signal magnetic field induced from a recording medium. This causes a relative angle to a magnetization of the magnetic pinned layer 17 to vary. Accordingly, a resistance of the sensor 11 changes due to a tunnel magnetoresistive effect. Eventually, information recorded in the recording medium can be reproduced.

A second embodiment has such a structure that: only the gap between the magnetic shields is tilted with respect to the cross-track direction; and the sensor 11 is made parallel with the cross-track direction using the upper flattening layer 14 and lower flattening layer 15.

The shape of a sensitivity distribution in the reproducing head is determined based on the shape of the magnetic shield-to-shield gap. Specifically, even when the sensor is formed so that the longitudinal direction thereof is substantially parallel with the cross-track direction, a signal magnetic field induced from the recording medium according to the slope of the gap between the magnetic shields is applied to the sensor. Therefore, even when the sensor is not tilted, if the gap between the magnetic shields is tilted with respect to the cross-track direction, an increase in a bit error rate attributable to a transition curvature can be prevented. The bit error rate can be, similarly to that in the first embodiment, decreased more effectively than that in the existing structure.

In the present embodiment, owing to the upper flattening layer 14 and lower flattening layer 15, the sensor 11 can be formed on a flat plane. A process of forming the sensor is therefore simplified compared with that of the first embodiment.

Similarly to the structure employed in the first embodiment, assuming that α denotes the mean angle of a bit transition curvature on an effective recording track, when the tilt angle θ of the magnetic shields ranges from 0° to 2.5×α, a lower bit error rate than that attained in the existing structure can be realized.

In addition, when the tilt angle e ranges from 1.0×α to 1.6×α, an effect of decreasing a bit error rate is maximized.

(Third Embodiment)

A third embodiment is implemented in a differential type reproducing head having two sensors juxtaposed in a down-track direction with an appropriate space between them. In the differential type reproducing head, each of the two sensors senses a signal magnetic field induced from a medium, and a difference between the outputs of the two sensors is acquired as a final output of the reproducing head. For example, when the two sensors lie on the same bit in the down-track direction, the two sensors generate outputs of opposite positive and negative polarities. As a result, when the two sensors lie on the same bit in the down-track direction, the difference between the outputs thereof is null, and the output of the entire reproducing head is null. In contrast, at an instant when the two sensors lie on different bits in the down-track direction, the outputs of the two sensors exhibit the same polarity. Therefore, the difference between the outputs of the two sensors is not null, but the output of the reproducing head is observed as a whole. The differential type reproducing head can thus reproduce a recording pattern. In the differential type reproducing head, the space between the two sensors deeply correlates with a signal resolution. When the space between the sensors is made narrower, the signal resolution gets higher. Therefore, when the differential type reproducing head is adopted as a reproducing head that adopts a shingled recording method, parts that sense the signals of the two sensors and the space between the parts that sense the two signals are tilted in line with a transition curvature. Thus, degradation of a signal resolution and a decrease in a signal-to-noise ratio can be suppressed, and a bit error rate can be decreased.

Figure 10:
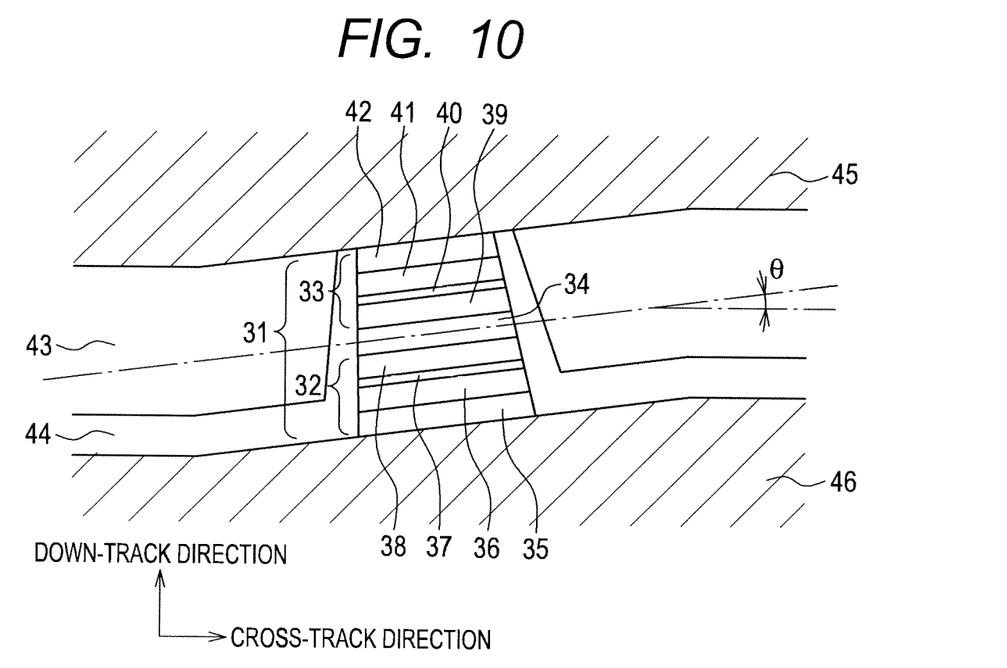
FIG. 10 is a diagram showing a construction of a reproducing head of a third embodiment of the present invention.

FIG. 10 is an illustrative diagram showing the shape of a medium opposite surface of an example of a third construction of the present invention adapted to a differential type reproducing head.

A sensor 31 is included in a differential type reproducing head, and has a first sensor and a second sensor 33, each of which senses a signal magnetic field induced from a recording medium, juxtaposed in the downtrack direction with a differential intermediate layer between them.

The sensor 31 includes a first antiferromagnetic layer 35, a first magnetic pinned layer 36, a first nonmagnetic intermediate layer 37, a first magnetic free layer 38, a differential intermediate layer 34, a second magnetic free layer 39, a second nonmagnetic intermediate layer 40, a second magnetic pinned layer 41, and a second antiferromagnetic layer 42.

In the third embodiment, the first magnetic free layer 38, differential intermediate layer 34, and second magnetic free layer 39 are formed to tilt with respect to the cross-track direction in line with a transition curvature of an effective record pattern.

The first magnetic pinned layer 36, second magnetic pinned layer 41, first magnetic free layer 38, and second magnetic free layer 39 are formed with laminated films made of a CoFe alloy or a NiFe alloy. Alternatively, single-ply films made of a CoFeB alloy, a CoMnGe Heuslar alloy, a CoMnSi Heuslar alloy, a CoCrAl Heuslar alloy, or a CoFeAl alloy, or laminated films made of a combination of any of these alloys will do.

The first nonmagnetic intermediate layer 37 and second 25 nonmagnetic intermediate layer 40 are formed using MgO in efforts to exert a tunnel magnetoresistive effect. Alternatively, alumina or titanium oxide may be employed. Otherwise, Cu, Au, Ag, or an alloy thereof may be used in order to exert a giant magnetoresistive effect.

The first magnetic pinned layer 36 and second magnetic pinned layer 41 have the directions of magnetizations thereof fixed by the first antiferromagnetic layer 35 and second antiferromagnetic layer 42 respectively so that the magnetizations become substantially antiparallel with each other.

The first magnetic pinned layer 36 and second magnetic pinned layer 41 may be formed with one-ply magnetic layers. Even if each of the first magnetic pinned layer 36 and second magnetic pinned layer 41 is constructed to include plural magnetic layers that sandwich a bonding layer which bonds magnetizations in antiparallel with each other, the construction will not contradict the gist of the present invention. If each of the first magnetic pinned layer 36 and second magnetic pinned layer 41 is constructed with the plural magnetic layers, the direction of a magnetization of a magnetic layer used to form the first magnetic pinned layer 36 located closest to the first magnetic free layer 38 and the direction of a magnetization of a magnetic layer used to form the second magnetic pinned layer 41 located 2S closest to the second magnetic free layer 39 are fixed to be substantially antiparallel with each other.

Bias layers 43 are arranged on both sides in the cross-track direction of the sensor. Nonmagnetic substances 44 are formed among the bias layers 43, first magnetic free layer 38, and second magnetic free layer 39. The first magnetic free layer 38 and second magnetic free layer 39 have the domains thereof controlled with magnetic fields applied from the bias layers 43, and act at a desired utilization rate in response to a magnetic field that should be sensed. In FIG. 10, the one-ply bias layers are used to control the domains of the first magnetic free layer 38 and second magnetic free layer 39 respectively. Alternatively, each of the bias layers may be divided into two plies with a nonmagnetic layer between them so that a domain control magnetic field can be applied to each of the first magnetic free layer and second magnetic free layer.

A discussion will made of, for example, a case where the direction of a magnetization of the first magnetic pinned layer 36 corresponds to the depth direction of the head originating from the medium opposite surface thereof, and the direction of a magnetization of the second magnetic pinned layer 41 is antiparallel with the direction of the magnetization of the first magnetic pinned layer. Assuming that the first magnetic free layer 38 and second magnetic free layer 39 lie on the same bit and a signal magnetic field induced from the bit is oriented in the depth direction of the head originating from the medium surface, the magnetization of the first magnetic free layer 38 approaches the magnetization of the first magnetic pinned layer 36 so that the directions of the magnetizations become parallel with each other. A resistance of the first sensor 32 decreases. In contrast, the magnetization of the second magnetic free layer approaches the magnetization of the second magnetic pinned layer 41 so that the directions of the magnetizations become antiparallel with each other, and a resistance of the second sensor 33 increases. The changes in the resistances of the first sensor 32 and second sensor 33 are opposite to each other, that is, one of the changes in the resistances is positive and the other one thereof is negative, and the change in the resistance of the entire reproduction head is null. When the first magnetic free layer 38 and second magnetic free layer 39 lie across a bit transition, the direction of a signal magnetic field applied from the recording medium is different between the first magnetic free layer 38 and second magnetic free layer 39. The resistances of the first sensor 32 and second sensor 33 are increased (or decreased). Thus, the differential type reproducing head can reproduce a record pattern.

Therefore, when the differential type reproducing head is employed in shingled recording, similarly to when a reproducing head including one sensor and magnetic shields that sandwich the sensor is employed, a signal resolution and a signal-to-noise ratio are degraded due to an asymmetrical transition curvature and a bit error rate is decreased.

In the case of the reproducing heads employed in the first and second embodiments, the shape of a sensitivity distribution in the reproducing head is determined with the shape of the gap between the magnetic shields. In the case of the differential type reproducing head, the shape of a difference between the sensitivity distributions in the first magnetic free layer 38 and second magnetic free layer 39 sandwiching the differential intermediate layer 34 is 15 equivalent to that of the sensitivity distribution in the differential type reproducing head.

Therefore, when the first magnetic free layer 38, differential intermediate layer 34, and second magnetic free layer 39 are tilted with respect to the cross-track direction in line with a transition curvature in an effective record pattern, the signal resolution and signal-to-noise ratio can be upgraded, and the bit error rate can be minimized.

Even in the case of the differential type reproducing head, for the same reason as the reason in the first and second embodiments, assuming that α denotes a mean angle of a bit transition curvature on an effective recording track, when the tilt angle e by which the first magnetic free layer 38, differential intermediate layer 34, and second magnetic free layer 39 are tilted ranges from 0° to 2.5×, a bit error rate lower than that caused by the existing structure can be realized.

When the tilt angle ranges from 1.0× to 1.6×α, an effect of decreasing the bit error rate is maximized.

Incidentally, the order in which the layers of the sensor are superposed on one another may be changed into the order of the first antiferromagnetic layer, first magnetic pinned layer, first nonmagnetic intermediate layer, first magnetic free layer, differential intermediate layer, second antiferromagnetic layer, second magnetic pinned layer, second nonmagnetic intermediate layer, and second magnetic free layer. Nevertheless, it does not contradict the gist of the present invention.

(Fourth Embodiment)

Figure 11:
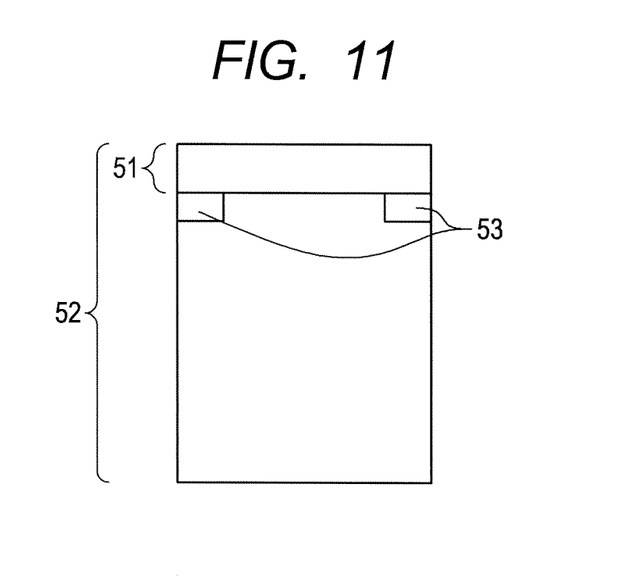
FIG. 11 is a diagram showing a construction of a head slider included in a magnetic drive of a fourth embodiment of the present invention.

FIG. 11 is an illustrative diagram showing the shape of a medium opposite surface of a head slider included in a magnetic disk drive in accordance with the present invention.

As shown in FIG. 11, in addition to a head 51 including a recording head and a reproducing head, two piezoelectric elements 53 are incorporated in a head slider 52 so that the piezoelectric elements are juxtaposed in a cross-track direction. The piezoelectric elements refer to an example of an actuator that tilts the magnetic head of the present invention.

Figure 12:
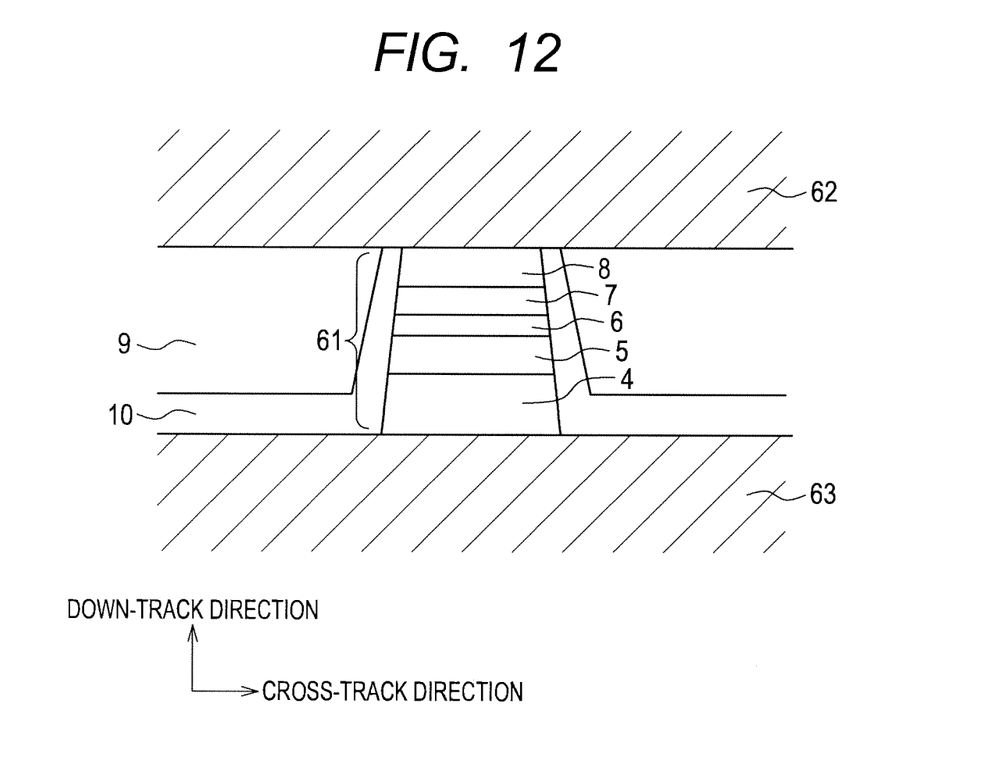
FIG. 12 is a diagram showing a construction of a reproducing head included in the magnetic drive of the fourth embodiment of the present invention.

FIG. 12 is an illustrative diagram showing a medium opposite surface of the reproducing head in a state in which no voltage is applied to the piezoelectric elements. In this construction, the reproducing head includes a sensor 61 and a pair of magnetic shields (an upper magnetic shield 62 and a lower magnetic shield 63) that sandwich the sensor. The gap between the magnetic shields is not tilted with respect to the cross-track direction in the same manner as that included in the existing structure. The layers constituting the sensor 61 are identical to those shown in FIG. 1.

In the present embodiment, at the time of reproduction, voltages of different positive and negative polarities are applied to the right and left piezoelectric elements respectively. Accordingly, one of the piezoelectric elements stretches and the other one contracts. As a result, the head assembly 51 is tilted with respect to the cross-track direction. Eventually, the gap between the magnetic shields 62 and 63 can be tilted with respect to the cross-track direction of a recording track in line with a transition curvature in an effective recording pattern.

For the same reason as the reason in the first embodiment, assuming that $\alpha$ denotes a mean angle of a bit transition curvature on an effective record track, if the tilt angle $\theta$ of the magnetic shield-to-shield gap ranges from 0° to 2.5×, a bit error rate lower than that attained in the existing structure can be realized.

In addition, when the tilt angle $\theta$ ranges from $1.0 \times \alpha 10$ to $1.6 \times \alpha$, an effect of decreasing the bit error rate is maximized.

(Fifth Embodiment)

Figure 13:
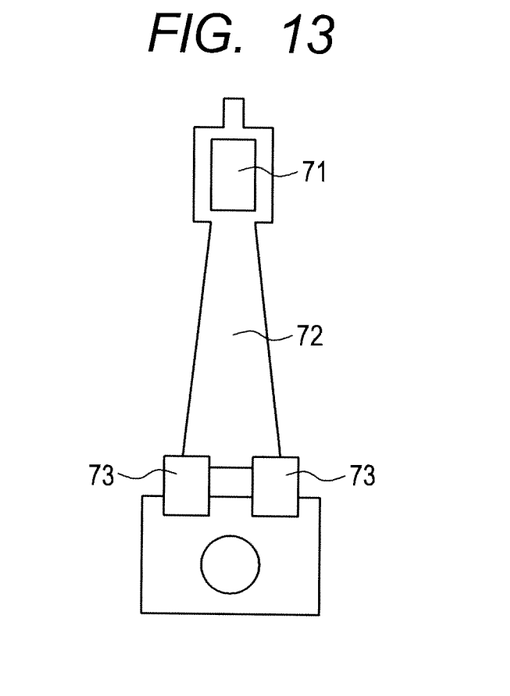
FIG. 13 is a diagram showing a construction of a head suspension included in a magnetic drive of a fifth embodiment of the present invention.

FIG. 13 is an illustrative diagram showing the shape of a head suspension included in a magnetic disk drive in accordance with the present invention.

As shown in FIG. 13, the head suspension 72 incorporating a head slider 71 is provided with two right and left piezoelectric elements 73. The piezoelectric elements refer to an example of an actuator that tilts the magnetic head employed in the present invention.

The illustrative diagram of the medium opposite surface of the reproducing head in a state in which no voltage is applied to the piezoelectric elements is identical to FIG. 12. The reproducing head includes the sensor 61 and the pair of magnetic shields (the upper magnetic shield 62 and lower magnetic shield 63) that sandwich the sensor. The gap between the magnetic shields is not tilted with respect to the cross-track direction in the same manner as that in the existing structure.

In the present embodiment, at the time of reproduction, voltages of different positive and negative polarities are applied to the right and left piezoelectric elements 73 attached to the suspension. Accordingly, one of the piezoelectric elements stretches and the other one contracts. As a result, the head slider is tilted with respect to the cross-track direction of a recording track. Eventually, the gap between the magnetic shields can be tilted with respect to the cross-track direction in line with a transition curvature in an effective record pattern.

For the same reason as the reason in the first embodiment, assuming that $\alpha$ denotes a mean angle of a bit transition curvature on an effective recording track, when the tilt angle $\theta$ of the magnetic shield-to-shield gap ranges from 0° to $2.5 \times \alpha$, a bit error rate lower than that caused by the existing structure can be realized.

In addition, when the tilt angle $\theta$ ranges from $1.0 \times \alpha$ to $1.6 \times \alpha$, an effect of decreasing the bit error rate is maximized.

Figure 14:
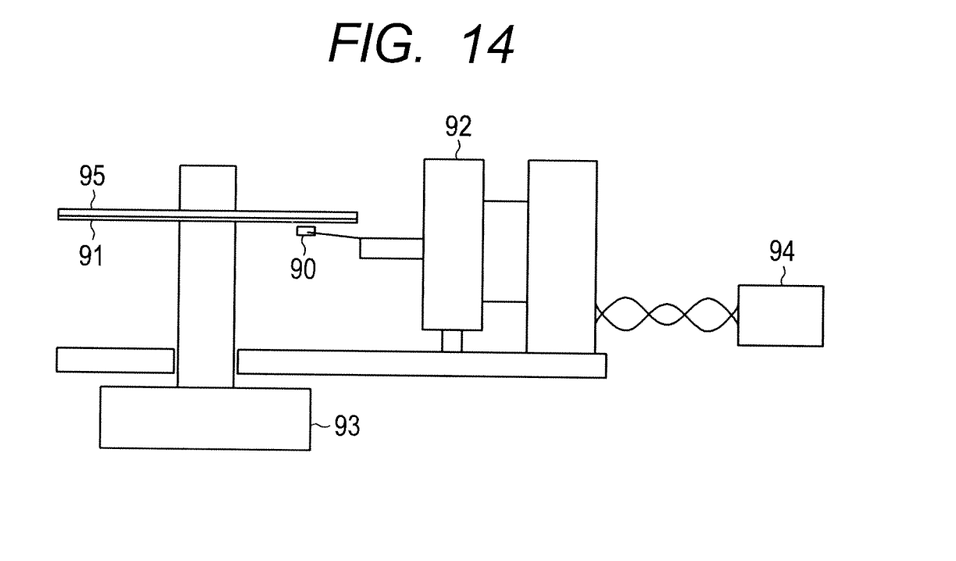
FIG. 14 is a diagram showing an example of a construction of a magnetic recording/reproducing apparatus to which the present invention is adapted.

FIG. 14 shows an example of a construction of a magnetic recording/reproducing apparatus which adopts vertical magnetic recording and to which the present invention is adapted.

A disk 91 that holds a recording medium 95 in which information is magnetically recorded is rotated by a spindle motor 93, and a head slider 90 is introduced to above a track of the disk 91 by an actuator 92. Specifically, in a magnetic disk drive, a reproducing head and a recording head which are formed on the head slider 90 approach a predetermined record position on the disk 91 by means of the mechanism, move relatively to each other, and sequentially write or read a signal. The actuator 92 is preferably a rotary actuator. A record signal is recorded in the medium by the recording head via a signal processing system 94, and an output of the reproducing head is acquired as a signal via the signal processing system 94. When the reproducing head is moved to above a desired record track, a high-sensitivity output from the reproducing head is used to detect the position on the track. The actuator 92 is controlled in order to position the head slider 90. In the drawing, one head slider 90 and one disk 91 are shown. Alternatively, plural head sliders 90 and plural disks 91 may be included. The disk 91 may have recording media 95 on respective sides thereof, and 25 information may be recorded on the recording media. When information is recorded on both the sides of the disk 91, the head sliders 90 are placed on the respective sides of the disk.

In relation to the foregoing magnetic recording/reproducing apparatus, the magnetic head and magnetic disk drive in accordance with the present invention were tested. The results of the test demonstrate that degradation of a resolution and a decrease in a signal-to-noise ratio can be prevented and a low bit error rate can be realized.

The present invention can be utilized for a magnetic sensor and a magnetic head which are of an intra-surface current type based on a giant magnetoresistive effect or of a vertical current type, and a magnetic sensor and a magnetic head which are based on a tunnel magnetoresistive effect.

What is claimed is:

1. A magnetic head to be used for a shingled recording method in which a recording track is formed while being overwritten on one side of a recording pattern, wherein:
   the magnetic head includes a recording head and a reproducing head;
   the reproducing head includes a pair of magnetic shields and a sensor sandwiched between the pair of magnetic shields; and
   a gap between the magnetic shields is formed so that the longitudinal direction thereof gets inclined with respect to a cross-track direction in line with the shape of a curvature of an inter-bit transition on an effective recording track in the recording pattern recorded on a recording medium.

2. The magnetic head according to claim 1, wherein assuming that $\alpha$ denotes a mean angle of an inter-bit transition curvature on an effective recording track in a recording pattern recorded on the recording medium, the tilt angle of the longitudinal direction of the gap between the magnetic shields with respect to the cross-track direction ranges from 0° to a 2.5 multiple of $\alpha$.

3. The magnetic head according to claim 1, wherein assuming that $\alpha$ denotes a mean angle of an inter-bit transition curvature on an effective recording track in a recording pattern recorded on the recording medium, the tilt angle of the longitudinal direction of the gap between the magnetic shields with respect to the cross-track direction ranges from a 1.0 multiple of $\alpha$ to a 1.5 multiple of $\alpha$.

4. The magnetic head according to claim 1, wherein the sensor of the reproducing head is formed so that the film surface direction thereof gets inclined with respect to the same direction as the direction with respect to which the gap between the magnetic shields is tilted.

5. The magnetic head according to claim 1, wherein the reproducing head includes a flattening layer between the magnetic shields, and the sensor of the reproducing head is formed so that the film-surface direction thereof corresponds to the cross-track direction.

6. The magnetic head according to claim 1, wherein the sensor of the reproducing head includes a magnetic pinned layer, a nonmagnetic intermediate layer, and a magnetic free layer.

* * * * *